United States Patent [19]

Acampora et al.

[11] 4,232,197

[45] Nov. 4, 1980

[54] PROCESSOR FOR A TDMA BURST MODEM

[75] Inventors: Anthony Acampora, Freehold; Rollin E. Langseth, Colts Neck, both of N.J.

[73] Assignee: Bell Telephone Laboratories, Incorporated, Murray Hill, N.J.

[21] Appl. No.: 936,714

[22] Filed: Aug. 25, 1978

[51] Int. Cl.² ............................................. H04J 3/06
[52] U.S. Cl. .................................. 370/97; 370/104; 455/12
[58] Field of Search .................. 179/15 BS; 325/4

[56] References Cited

U.S. PATENT DOCUMENTS

| | | | |
|---|---|---|---|
| 3,532,985 | 10/1970 | Glomb | 325/4 |
| 3,562,432 | 2/1971 | Gabbard | 179/15 BS |
| 3,641,274 | 2/1972 | Sasaki | 179/15 BS |
| 3,643,031 | 2/1972 | Sasaki | 179/15 BS |
| 3,730,998 | 5/1973 | Schmidt | 179/15 BS |
| 3,787,634 | 1/1974 | Haberle | 179/15 BS |
| 3,995,111 | 11/1976 | Tsuji | 178/69.1 |
| 4,054,753 | 10/1977 | Kaul | 179/15 BS |

OTHER PUBLICATIONS

*IEEE Transactions on Communications*, vol. com-16, No. 4, Aug. 1968, "Design of a Satellite Time Division Multiple Access Burst Synchronizer", by Gabbard, pp. 589-596.

*Electronic Letters*, vol. 9, No. 4, Nov. 1973, "New Synchronization Scheme for Communication-Satellite TDMA Systems", by A. K. Jefferis, pp. 566-568.

*Primary Examiner*—David L. Stewart
*Attorney, Agent, or Firm*—Erwin W. Pfeifle

[57] ABSTRACT

The present invention provides a processor for interfacing a TDMA burst modem (40), which transmits and receives bursts of information at high data rates in assigned time slots, and slow speed terminal processing equipment. The present processor comprises circuitry (50) capable of detecting frame or superframe markers in a received sequence and regenerating such markers, after initiation, at the normal interval for such markers despite false alarms or missed marker signals. Other circuitry (53, 57 and 52, 62) causes a memory (48, 56) to directly output a burst of information during an assigned time slot to the modem (40) and directly store received information from modem (40) during a predetermined interval which is designed to start before and end after the expected arrival of an assigned burst. Slower processing equipment is then used to find and process the burst in the stored information.

11 Claims, 11 Drawing Figures

PROCESSOR FOR A TDMA BURST MODEM

TECHNICAL FIELD

The present invention relates to a processor for a time division multiple access (TDMA) burst modem and, more particularly, to a processor for a TDMA burst modem which functions to regenerate marker indications from marker signals received in each frame or superframe signaling format and, in response to such marker indications, enable a high speed memory for directly storing received signals, or for transmitting bursts, during one or more generated window intervals within the frame or superframe period.

BACKGROUND ART

In a time division multiple access (TDMA) satellite communication system, the various ground stations are assigned separate time slots within a frame period for transmitting bursts of information to other ground stations and for receiving bursts of information from other ground stations. In order to transmit or receive bursts of information within the proper assigned time slot of a frame interval, various synchronization and acquisition techniques have been proposed.

For example, in U.S. Pat. No. 3,643,031, issued to H. Sasaki et al on Feb. 15, 1972, a burst synchronization control unit is disclosed wherein counters count the frame periods to forecast the reception in the next frame period and a unique word detecting circuit then provides station discrimination from control information included in each received burst.

U.S. Pat. No. 3,730,998, issued to W. G. Schmidt et al on May 1, 1973, discloses a TDMA satellite communication system which generates aperture windows for acquisition purposes. For the receive side thereof, the TDMA signal is received and a demodulator recovers a clock signal and two data streams which are applied to a differential decoder unit and, in turn, to both a preamble detector and a descrambler unit. The preamble detector and an associated aperture generator function to detect frame markers which are used to synchronize bursts. The descrambler unit descrambles a unique word in each burst and applies such word to a demultiplexer unit which operates to extract signals in designated bursts and sub-bursts and apply such signals to a control unit or a proper terrestrial interface module.

With the proposed use of higher and higher data rates in satellite communication systems, the problem remaining in the prior art is to provide a processor for a TDMA burst modem with simple high-speed hardware while providing improved synchronization accuracy and reliability of modem operation with short length unique words.

BRIEF SUMMARY OF THE INVENTION

The foregoing problem is solved in accordance with the present invention which relates to a processor for a TDMA burst modem and, more particularly, to a processor for a TDMA burst modem which functions to regenerate marker indications from marker signals received in each frame or superframe signaling format and, in response to such marker indications, enable a high speed memory for directly storing received signals, or for transmitting bursts of information, during a generated window interval of the frame or superframe period.

It is an aspect of the present invention to provide a processor for a TDMA burst modem comprising a unique frame synchronizer and regenerator circuit which regenerates marker indications at the normal marker interval in each TDMA frame or superframe interval, after initiation, whether or not such frame marker is actually detected, a window generator responsive to the regenerated marker indications for generating an enable signal during one or more predetermined time intervals of a frame or superframe, a gating means for passing therethrough the information signals received or to be transmitted during the occurrence of the enable signal from the window generator to cause the direct storage or reading out, respectively, of the information signals in a high speed RAM type memory. Each enable signal produced by the window generator is timed to occur during an interval after a regenerated marker indication signal which covers the normal expected occurrence of a burst destined for the receiver. The remainder of the processing of the received and stored information signals can then be processed by slower speed apparatus.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIGS. 7–9 illustrate a flow diagram of the functional sequence employed by the processor in the frame synchronization and regeneration circuit of FIG. 6;

DETAILED DESCRIPTION

Figure 1:
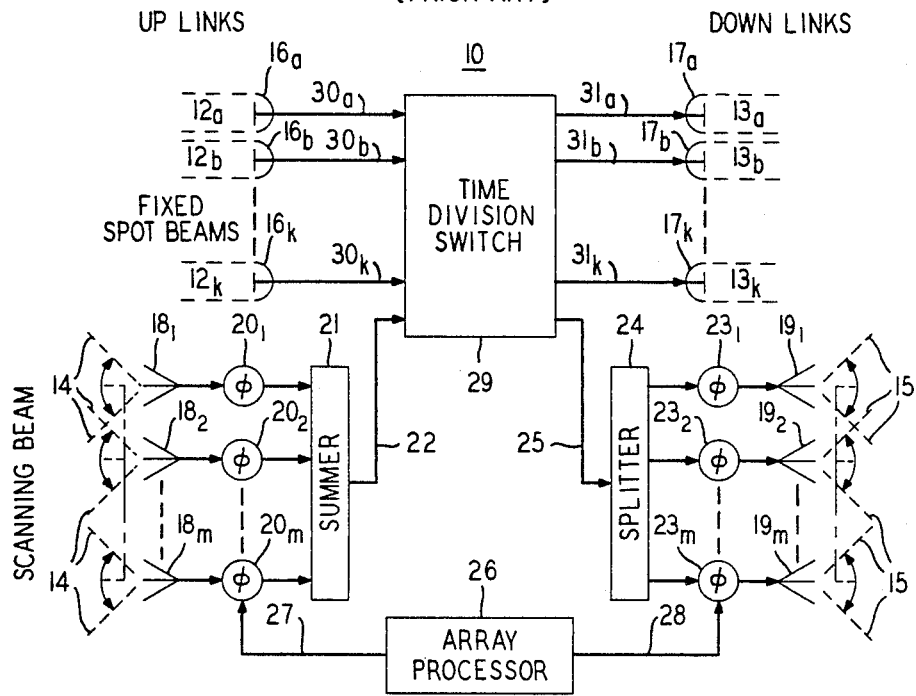
FIG. 1 is a block schematic of a prior art satellite time-division interconnection arrangement for selectively interconnecting a plurality of fixed up-link spot beams and an up-link scanning spot beam with a plurality of fixed down-link spot beams and a down-link scanning spot beam.

FIG. 1 illustrates a prior art basic satellite switching repeater 10 configuration for concurrently transmitting and receiving a plurality of fixed spot beams and one scanning spot beam. Such configuration is being described only to provide background information to permit subsequent illustration of how the present processor may operate in ground stations associated with either fixed or scanning spot beams in systems which may employ either fixed or scanning spot beams or both. For illustrative purposes hereinafter only, 11 up-link and 11 down-link fixed spot beams designated 12a–12k and 13a–13k, respectively, and a scanning up-link and down-link spot beam designated 14 and 15, respectively, are shown. Each of the associated up-link and down-link fixed spot beams 12a, 13a; 12b, 13b; . . . ; 12k, 13k are received from and transmitted to a separate fixed geographical ground areas (not shown) within the viewing area of satellite switching repeater 10. The up-link and down-link scanning spot beams 14 and 15 are scanned independently among a plurality of spaced-apart geographical ground areas (not shown) which do not form a part of the geographical ground areas associated with the various fixed spot beams 12 and 13. For illustrative purposes hereinafter only, the plurality of corresponding spaced-apart geographical ground areas associated with scanning spot beams 14 and 15 will be considered to include one hundred separate areas. It is also to be understood that each of the 11 fixed spot beam and 100 scanning spot beam geographical ground areas can include one or more ground stations desiring to communicate with any of the other ground stations in the same or other geographical ground areas.

Each of the up-link fixed spot beams 12a–12k are shown being intercepted or received at antennas 16a–16k, respectively, while each of the down-link fixed spot beams 13a–13k, are launched by antennas 17a–17k, respectively. The up-link and down-link scanning spot beams 14 and 15 are respectively received and transmitted by, for example, a phase array antenna as shown in FIG. 1 where the up-link receiving array and down-link transmitting array are each shown as comprising a plurality of m elementss $18_1$–$18_m$ and $19_1$–$19_m$, respectively. The receiving antenna elements $18_1$–$18_m$ are connected to phase shifters $20_1$–$20_m$, respectively, which, in turn, are connected to a summing circuit 21 for combining the output signals from phase shifter circuits $20_1$–$20_m$ into a single combined output signal on lead 22. Similarly, the input terminal of the down-link transmitting antenna elements $19_1$–$19_m$ are connected to the output terminals of phase shifters $23_1$–$23_m$, respectively, with the input terminal of phase shifters $23_1$–$23_m$ being connected to the output terminals of a splitting circuit 24. Splitting circuit 24 receives the instantaneous signal to be transmitted via scanning spot beam 15 on lead 25 and divides the signal equally for distribution to phase shifters $23_1$–$23_m$ which alters the phase of the associated input signal in a manner to cause elements $19_1$–$19_m$ to transmit scanning spot beam 15 in the desired direction as is well known in the art.

In the operation of each of scanning spot beams 14 and 15, an array processor 26 transmits a sequence of control signals over a bus 27 to each of the up-link phase shifters $20_1$–$20_m$ to cause the array to scan spot beam 14 over the associated scanning spot beam geographical ground areas in synchronization with the expected reception of signals from such ground areas. Concurrent therewith, the array processor 26 similarly transmits a separate sequence of control signals over a base 28 to each of the down-link phase shifters $23_1$–$23_m$ to cause the array to scan spot beam 15 over the associated scanning spot beam geographical ground areas in synchronization with the expected transmission of signals to such areas.

The up-link signals concurrently received via fixed spot beams 12a–12k and scanning spot beam 14 form separate input signals on leads 30a–30k and 22, respectively, to a time-division switching matrix 29. These input signals are concurrently and selectively switched by the space and time-division switching matrix 29 to the appropriate output lead 31a–31k and 25 for transmission via down-link fixed spot beams 13a–13k and scanning spot beam 15, respectively. For the exemplary 11 fixed and one scanning spot beam, time-division switch 29 would comprise a 12×12 array of microwave switches and their associated drivers (not shown) which would be under control of a clock and switching sequencer (also not shown).

Figure 2:
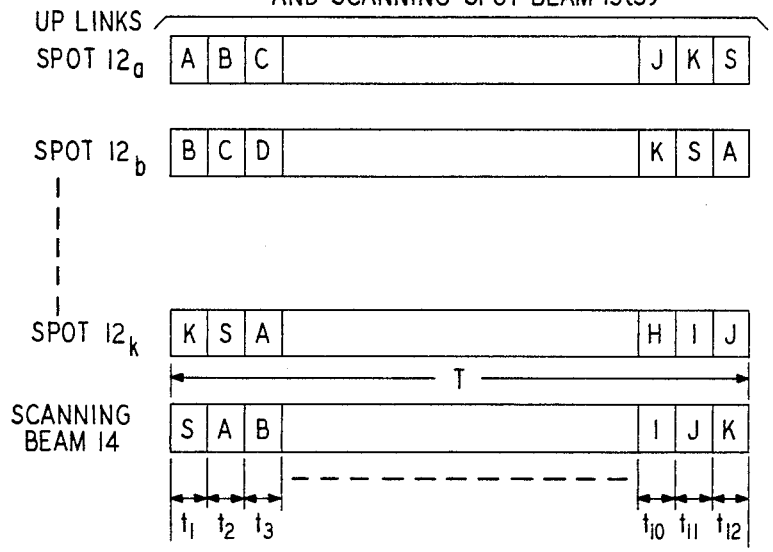
FIG. 2 illustrates an exemplary prior art switching frame sequence format for concurrently interconnecting 11 up-link fixed spot beams and one up-link scanning spot beam with 11 down-link fixed spot beams and one down-link scanning spot beam for use with the arrangement of FIG. 1.

The dynamic switching of the satellite switching matrix 29 is divided into a sequence of time intervals which are combined into a frame interval as shown in FIG. 2 for a typical sequence for use with a time-division multiplex mode of operation.

For purposes of illustration, it will be assumed that there is equal traffic among beams. Under such condition the satellite time-division switching matrix 29 follows a cyclic pattern and establishes connections among the various beams on a subframe basis per each switching frame, where in FIG. 2 for exemplary purposes, the switching frame is designated T and each of the sequential subframes therein has a separate designation in the sequence $t_1$–$t_h$, where h represents the total number of down-link beams and equals 12 for the exemplary system having 11 fixed up-link and down-link spot beams and one up-link and down-link scanning spot beam. In FIG. 2 up-link fixed spot beam 12a is shown sequentially connected by switching matrix 29 to down-link beams A(13a), B(13b), . . . , K(13k), and S(15) once during each switching frame period T. Concurrent therewith, up-link fixed spot beam 12b is sequentially connected by switching matrix 29 to down-link beam B(13b), C(13c), . . . , S(15) and A(13a) while up-link scanning spot beam 15 is sequentially connected to down-link beams S(15), A(13a), . . . , J(13j) and K(13k) during switching frame period T. Similarly all other up-link fixed spot beams 12c–12k are concurrently connected to the various down-link fixed spot beams 13a–13k and scanning spot beam 15 in a sequence which assures that no two up-link beams are connected at any instant of time to the same down-link beam. It is to be understood that the sequences shown in FIG. 2 for the switching of signals between up-link beams 12a–12k and 14 and down-link beams 13a–13k and 15 are merely illustrative of a typical set of sequences of which there are many other possibilities.

Figure 3:
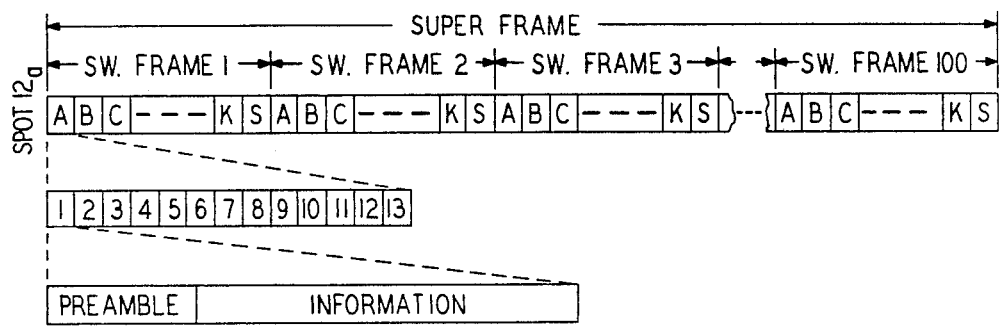
FIG. 3 illustrates an exemplary prior art superframe, frame, subframe and transmission burst format for a particular one of the up-link spot beams of FIG. 2.

FIG. 3 illustrates a more detailed sequence for the up-link spot beam 12a shown in FIG. 2. There, each of the subframes $t_1$–$t_{12}$ (A–K and S) in each frame associated with signals to be transmitted via down-link spot beams 13a–13k and 15, respectively, is shown including an exemplary 13 bursts of information with each burst of information including n bits comprising a preamble portion and an information portion as is well known in the art. The preamble portion for each burst generally includes information in various formats associated with, inter alia, carrier and timing recovery, start of message, destination address, the source address, the type of information included in the information portion of the burst and possibly frame marker indications. Each of bursts 1-13 of a subframe can be considered as one voice circuit which is selectively assignable for transmissions between a particular transmitting ground station associated with the particular up-link beam and a particular destination ground station associated with the down-link beam to which the subframe interval including such burst is switched. For example, if a voice circuit is needed between a ground station 1 and a ground station 3 in ground area A associated with beams 12a and 13a, then such requirements can be met by assigning, for example, burst 1 of subframe A in switching frame 1 thereto.

Since each switching frame only permits assignment of 13 voice circuits between ground areas associated with up-link and down-link beam, if the burst assignment in each sequential switching frame were identical, then problems of varied traffic requirements between the various ground stations in the 11 fixed and 100 scanning ground areas, and the inability to communicate with more than 13 ground stations in the scanning beam ground areas become apparent. To solve such problems, a format was provided which forms a 100 switching frame sequence into a superframe format which then provides 1300 voice circuits (13 bursts×100 switching frames) for selective assignment between ground stations serviced by a particular up-link beam 12a-12k or 14 and ground stations serviced by a particular down-link beam 13a-13k or 15. In this manner, if 100 voice circuits are required between a first and a second ground station, this requirement can be met by assigning one burst in each of the subframes of the 100 switching frames of the superframe which provides communication between the ground areas associated with the first and second ground areas. Alternatively, two bursts in alternate switcing frames or four bursts in every fourth switching frame, etc. could be assigned to such requirement and still provide 100 voice circuits per superframe, but for any of these alternative assignments techniques the buffering requirements at the first and second ground stations would be increased over the one burst per switching frame technique. It is to be understood that where less than 100 voice circuits are required between any two ground stations, the alternative assignment technique just described would be used to provide the necessary traffic requirements between ground stations. Traffic requirements between ground stations associated with each of the up-link and down-link scanning beams would be similarly assigned except that it might be desirable to assign sequential bursts of a switching frame to such requirement to reduce the scanning sequence of each scanning beam.

With the foregoing as background information, it will be considered hereinafter that one of the ground stations in the ground areas associated with up-link spot beam 12a is the master station for providing frame or superframe marker information to all other ground stations within the system. It will be further considered that this master station will transmit such frame or superframe marker information as a unique word (UW) in the preamble of the first burst of each subframe in switching frame No. 1 and the subframes S associated with down-link scanning beam 15 in switching frames 2-100 in the format of FIG. 3. Additionally, during the first burst of each of subframes S of switching frames 1-100 in FIG. 3, scanning beam 15 will be directed at a different one of the exemplary 100 scanning beam ground areas. In this manner all ground stations of the system will be able to receive a superframe marker signal during a superframe interval; the ground stations in the exemplary 11 spot beam areas receiving such superframe marker signal during switching frame 1 and ground stations in the scanning beam ground areas 1-100 receiving such superframe marker signal during switching frames 1-100, respectively. It is to be understood that the above-described format is exemplary only and not for purposes of limitation since any suitable frame or superframe marker format can be used for implementing the present processor for a TDMA burst modem.

Figure 4:
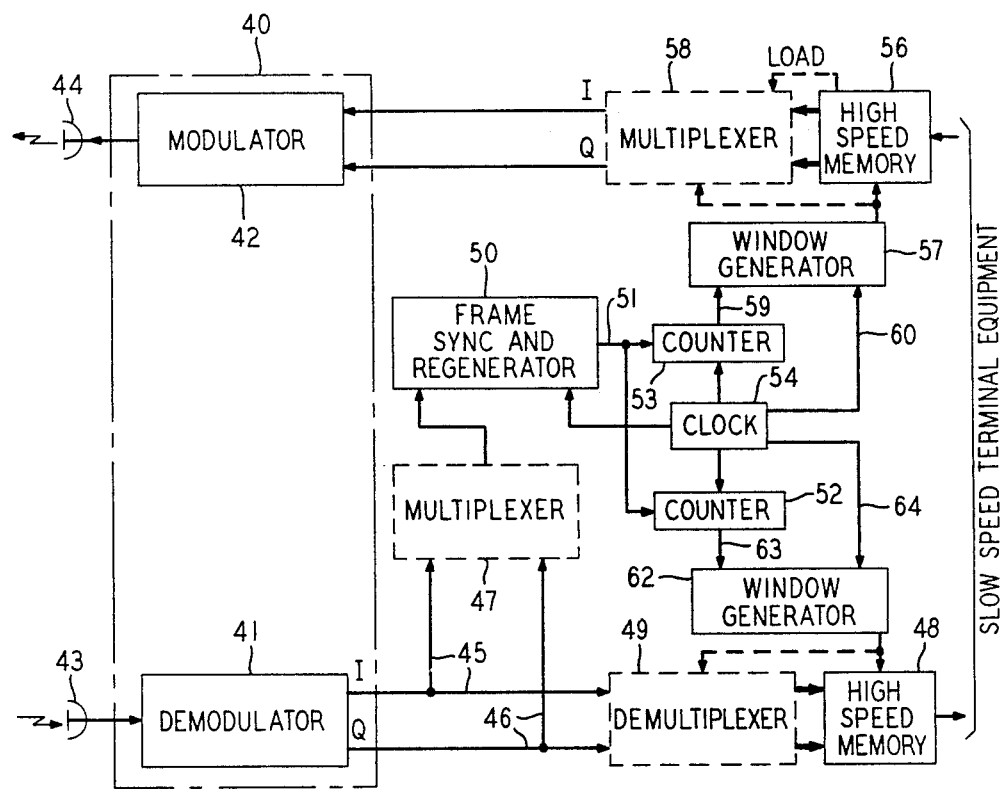
FIG. 4 is a block schematic of the high speed processor for a TDMA burst modem according to the present invention.

FIG. 4 is a block diagram of a processor for use with a TDMA burst modem 40 in accordance with the present invention. TDMA burst modem 40 includes a demodulator section 41 and a modulator section 42 which are connected on one side thereof to antennas 43 and 44, respectively, for receiving and transmitting signals from the remote satellite. For exemplary purposes only it will be assumed that the present satellite system transmits signals using 4-phase phase shift keying (PSK) signals and that demodulator 41 receives such signals and converts them into in-phase (I) and quadrature-phase (Q) digital signals at the output thereof while modulator 42 converts I and Q input signals into a 4-phase PSK output signal. For simplicity purposes it is assumed herein that the phase ambiguity for the I and Q signals have been resolved in either the areas of demodulator 41 for the receive side, or in the slow speed terminal equipment which connects to the present processor.

At the receive side, the I and Q outputs from demodulator 41 are transmitted over leads 45 and 46, respectively, to both optional multiplexer 47 and a high speed RAM type memory 48 via an optional demultiplexer 49. Optional multiplexer 47 is included to simplify the following discussion and functions to transform the I and Q inputs into a single digital output signal as is well known in the art. Alternatively, the I and Q signals can be maintained intact. This digital output signal is transmitted to a unique frame synchronization and regeneration circuit 50 where sequential bits which correspond to a frame or superframe synchronization UW format are detected and processed as will be described in more detail in association with FIGS. 5-8. Suffice it to say at this point that frame synchronization and regeneration circuit 50, once initiated, regenerates frame or superframe synchronization signals in sequence with the normal reception of such synchronization signals even under conditions when one or more of such synchronization signals are not actually detected or a false detection has occurred. The regenerated frame or superframe signal is outputted over lead 51 to counters 52 and 53. For the exemplary system described with FIGS. 1-3, the regenerated signal is really a superframe synchronization marker since each ground station only receives, barring false detections, one such marker during each superframe, and will therefore, hereinafter be only referred to as a superframe marker. It is to be understood that the present processor can be easily adjusted to operate with any sequence of actually received frame or superframe marker signals and that the referral to only a superframe marker hereinafter is merely exemplary and not for purposes of limitation.

Having acquired a reliable superframe marker, each ground station must now process both transmit and receive bursts. Via a signaling channel (not shown), each ground station is informed, to within a specified guard time, of its assigned transmit and receive time slot or slots with reference to the receipt of a superframe marker. Thus, data to be transmitted is slowly read into a buffer memory 56, which can be a separate memory or a section of memory 48, as it arrives from the source which is indicated as slow speed terminal equipment in FIG. 4. At the appropriate time, as determined by counter 53 and window generator 57, a transmission burst including the preamble and information portions as shown in FIG. 3 is transmitted via optional multiplexer 58, modulator 42 and antenna 44 at the assigned transmit time slot or time slots after the reception of the superframe marker signal.

To accomplish such transmission counter 53 is enabled by the regenerated superframe marker on lead 51, from frame synchronization and regeneration circuit 50, to count clock signals corresponding to the bit transmission rate of the communication system. At a count previously received via a signaling link (not shown) and entered into counter 53, which corresponds to the beginning of the time slot or slots assigned this transmitter during a superframe period, counter 53 transmits an enable pulse on lead 59 to window generator 57. Window generator 57 is responsive to the enable pulse on lead 59 to cause clock pulses on lead 60, corresponding to the bit transmission rate of the system, to be gated therethrough to optional multiplexer 58 and memory 56 for a period of time corresponding to the length of the transmission burst in each assigned time slot of a superframe interval.

The receive function is performed in similar fashion, except additional processing is necessary. Because of the inevitable uncertainties in knowledge of the precise burst arrival times, it is expedient to decode the superframe counter 52 in such a way as to open a window with window generator 62 slightly before the expected time of arrival of each assigned burst, and then directly write into buffer memory 48 unprocessed received information to at least completely contain the known assigned burst information. More particularly, counter 52 is enabled by the regenerated superframe marker on lead 51 to count clock signals at the bit transmission rate of the system and to generate an enable pulse on lead 63 to window generator 62 when the count equals a count previously received via the signaling link (not shown) and stored in counter 52. This enable signal on lead 63 occurs f number of clock pulses before the expected arrival of the transmission burst for this receiver. The enable pulse on lead 63 causes window generator 62 to pass clock pulses on lead 64 therethrough to optional demultiplexer 49 and memory 48 for a period of time which includes the f clock pulses, and at least the n bits of received assigned transmission burst. Therefore, received bits are directly stored in memory 48 during a period of time which extends from just before the expected reception of an assigned transmission burst to just after the expected reception of this burst to ensure reception of the whole burst. After this unprocessed information is directly loaded into memory 48, slower-speed terminal processing equipment can be used to determine the exact starting point, within the stored sequence, of the assigned transmission burst for subsequent processing of the burst information.

Figure 10:
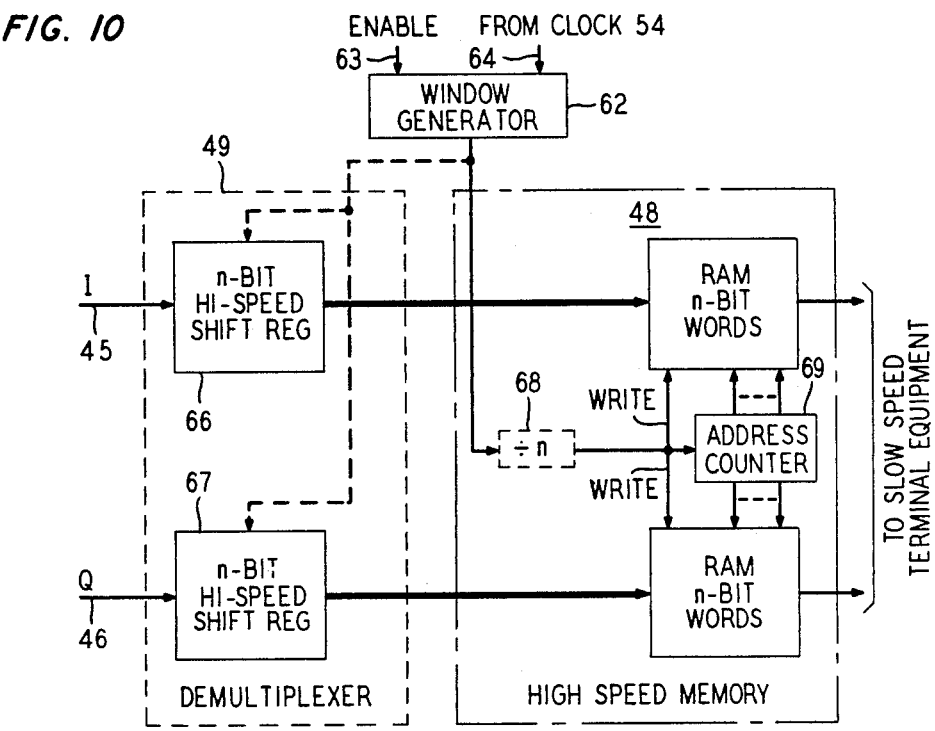
FIG. 10 is a block schematic of the serial-to-parallel conversion and storage circuitry for the receive side of the present processor.

FIG. 10 more clearly illustrates the functioning of window generator 62, demultiplexer 49 and memory 48 in processing the received information burst. There, the enable pulse on lead 63 to window generator 62 causes window generator 62 to time a certain window interval during which clock pulses on lead 64 are gated therethrough to demultiplexer 49 and memory 48 at the bit transmission rate of the system. These clock pulses are used to shift received bits in the I and Q digital signals from demodulator 41 through n-bit high speed shift registers 66 and 67, respectively, and to generate a write signal every $n^{th}$ bit by circuit 68 in memory 48. This write signal generated by circuit 68 increments address counter 69 by one and causes the n-bit word present in the shift registers 66 and 67 to be written into separate memory locations in memory 48.

Figure 11:
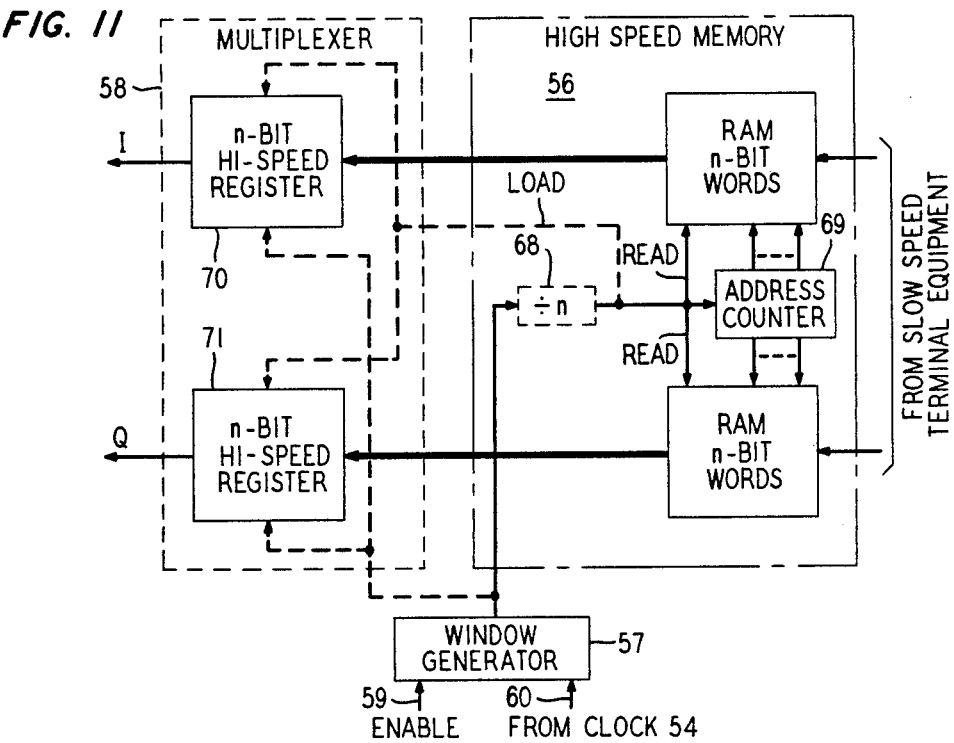
FIG. 11 is a block schematic of the transmit side of the present processor.

Window generator 57, memory 56 and multiplexer 58 perform in a similar fashion on the transmit side of the present processor and a configuration for implementing such functioning, which is similar to FIG. 10, is illustrated in FIG. 11. In FIG. 11, the clock pulses gated through window generator 57 during the window interval cause memory 56 to write an n-bit I and Q word into registers 70 and 71, respectively, every $n^{th}$ clock pulse and to serially transmit such words concurrently to modulator 42. It is to be understood that window generators 57 and 62, memory 48 and 56, multiplexer 58 and demultiplexer 49 can comprise any suitable circuitry for providing the functions indicated hereinbefore. Multiplexer 58 and demultiplexer 49 have been described as optional equipment since such circuits may not be needed if a sufficiently fast memory is available for directly writing the demodulated bit stream into memory or for directly transmitting the stored bits to modulator 42 in the appropriate manner.

Figure 5:
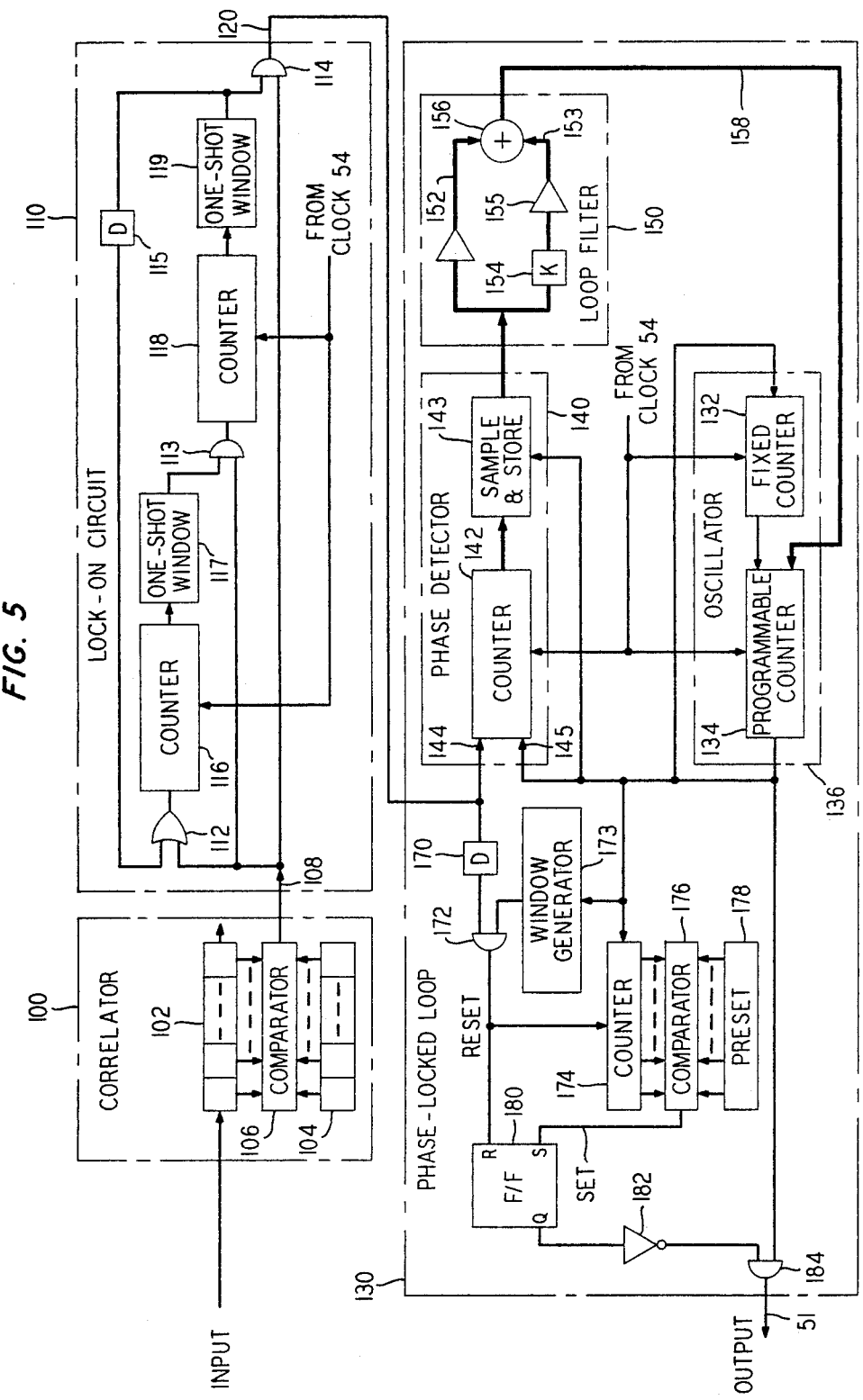
FIG. 5 is a block schematic of one arrangement for implementing the frame synchronization and regeneration circuit of the processor for a TDMA burst modem in accordance with the present invention.

FIG. 5 illustrates a unique arrangement for implementing the function of frame synchronization and regeneration circuit 50 of FIG. 4. The multiplexed bit stream from optional multiplexer 47 is applied as an input to a correlator 100 comprising a P-bit shift register 102, a P-bit register 104, and a multi-input comparator 106. Alternatively, where both an I and Q input signal are received, shift register 102 would be replaced by two shift registers each of length P/2 and capable of accepting a separate one of the I and Q inputs as is well known in the art. In operation, a unique P-bit word, corresponding to the code of the superframe marker, is stored in register 104. The received multiplexed bit stream is continuously shifted through shift register 102. When all the bits stored momentarily in register 102 correspond to the unique word stored in register 104, comparator 106 generates an output pulse on lead 108 to a lock-on circuit 110. It is to be understood that correlator 100 can comprise any suitable analog or digital arrangement which will receive the unprocessed analog signal or a converted digital signal, respectively, from demodulator 41 and generate an output pulse when consecutive symbols of the received signal correspond to a unique word representative of a superframe marker.

Lock-on circuit 110 is shown as comprising an OR gate 112 and two AND gates 113 and 114, each being capable of receiving the output signal from correlator 100 at a first input thereof. The output of OR gate 112 is shown connected to a counter 116 with the output of counter 116 connected to a one-shot window circuit 117 which has its output connected to a second input of AND gate 113. AND gate 113 has its output connected to the input of a counter 118 with the output of counter 118 connected to a one-shot window circuit 119 which has its output connected to both a second input of AND gate 114 and a second input of OR gate 112. For proper operation counters 116 and 118 should be of the non-retriggerable type where once commanded to begin counting, any enable pulse arriving during a particular counting interval will be ignored.

In operation, a predetermined count which is slightly smaller than the bit positions between superframe markers in the format of FIG. 3 is stored in counters 116 and 118. On initiation, a first pulse from correlator 100 is gated through OR gate 112, but not AND gate 113 or 114, to enable counter 116. Counter 116 counts the clock pulses, corresponding to the bit transmission rate of the system, from clock 54 and when the count corresponds to the previously stored predetermined count an enable pulse is generated and transmitted to one-shot window circuit 117. Window circuit 117 is responsive to the enable pulse to generate a high output to AND gate 113 during a predetermined narrow window interval, of, for example, 10-20 bits in duration, which will overlap the time when the second superframe marker pulse from correlator 100 is expected. If the second pulse from correlator 100 does not arrive during the narrow window interval generated by window circuit 117, then the procedure is again initiated on the next pulse from correlator 100, and it can be assumed that the first pulse was a false alarm.

If, however, a second pulse from correlator 100 is received during the narrow window interval generated by window circuit 117, then the second pulse is gated through both OR gate 112, to again initiate the sequence just described for counter 116 and window circuit 117, and AND gate 113 to enable counter 118. Counter 118, once enabled, counts the clock pulses from clock 54 and generates an output pulse when the count equals the previously stored predetermined count. The output pulse from counter 118 enables one-shot window circuit 119 which generates a high output during a narrow window interval, of, for example, 10-20 bits in duration, to a second input of AND gate 114 and OR gate 112. If a third pulse is generated by correlator 100 during the window intervals generated by window circuits 117 and 119, counters 116 and 118 will be again enabled, to repeat the previously described procedure, and AND gate 114 will generate an output pulse on lead 120 to phase-locked loop circuit 130.

From the foregoing description it can be seen that the output of the first window circuit 117 and the correlator 100 output are applied to an AND gate 113 such that the output of that gate will be high only if a superframe marker was detected during the window interval. Thus, the enable pulse to the first counter 116 and detected superframe marker from correlator 100 must be spaced by the superframe duration. This output triggers a second counter-window 118-119 combination, the output of which is combined with the correlator 100 output in AND gate 114 such that the output of that gate is high only if a superframe marker detected by correlator 100 is within the second window interval. Thus, from a cold start, three events approximately spaced by the superframe duration must occur for the gating network of lock-on circuit 110 to designate a superframe marker. Since false alarms occur randomly at the output of correlator 100, the probability that a false alarm appears at the output of the gating network becomes $(\frac{1}{2}^P)^3$, where P is the superframe unique word length used. However, if we let R be the superframe marker detection probability at the correlator 100 output, then the detection probability at the output of the gating network is reduced to $R^3$.

Having initially acquired three appropriately spaced events, feedback is provided from the output of the second window generator circuit 119 through delay circuit 115 to OR gate 112 and, in turn, to the enable input of the first counter 116 such that a single superframe marker undetected by correlator 100 does not disrupt the window generation process. The length of delay caused by delay circuit 115 is fixed such that a correlator 100 output signal appearing on lead 108 would normally precede the delay circuit 115 output signal to enable counter 116. Two successive superframe markers undetected by the correlator will, however, break the cycle, thereby admitting the possibility of false alarm generation. The probability that a false alarm is generated thereby becomes $(1-R)^2 \times (\frac{1}{2}^P)^3$.

The window gating technique is seen to greatly reduce the false alarm rate of the simple correlator network, although, again, this gain is realized at the expense of reducing the detection probability. Moreover, once the window cycle is broken, an extended search interval may elapse before the cycle is reestablished.

To improve reliability of the frame marker regeneration, a final network 130 whose operation is analogous to a phase locked loop is included. A fixed counter 132, which counts a number of clock cycles slightly smaller than the number of bits in a superframe, plus a counter 134 which can be programmed to count a predetermined number of bits, which typically can range between zero and 200 bits, are connected in a feedback reset arrangement to form an oscillator 136 which emits pulses of one bit duration at the output of programmable counter 134. The spacing between such pulses is nominally one superframe. Each pulse starts the fixed counter 132; after this count is complete, a pulse is emitted which enables the programmable counter 134.

The pulses appearing at the output of the lock-on circuit 110 are ideally periodic at the superframe rate, except that false alarms may be present, bonafide superframe markers may be absent, and extended periods of inactivity may occasionally occur. It is intended that the oscillator 136 just described be locked to the ideal period of the incoming superframe markers.

To accomplish this, a phase detector 140 comprising a start-stop counter 142 and a sample-and-store circuit 143 is provided. The output of the lock-on circuit 110 on lead 120 is connected to the start terminal 144 of start-stop counter 142, and the output of oscillator 136 is connected to the stop terminal 145 of start-stop counter 142. The number of counts recorded in counter 142 between the appearances of the start and the stop signal is an indication of the phase error between the input signal on lead 120 and the oscillator 136 output signal. The output pulse from oscillator 136 also enables sample-and-store circuit 143 to store the count in counter 142 and prevent its loss before it has been processed. If a pulse is not generated on lead 120, the counter 142 will not be started and the previously recorded count will remain therein for retransmission to sample-and-store circuit 143 on the next pulse from oscillator 136.

Each count derived in phase detector 140 is applied to a digital filter 150 comprising a weighted straight through path 152 and a weighted accumulator path 153 in parallel with path 152 comprising an accumulator 154 and weighting device 155. Both of paths 152 and 153 provide separate inputs to an adder circuit 156. Thus, during each superframe period, the filtered error consists of the weighted sum of (1) the phase error for that superframe period as generated in path 152, and (2) the sum of all prior phase error as generated in path 153.

The filtered error output on lead 158 is applied to update the programmable counter 134 in such a way as to reduce the phase error between the arriving quasi-periodic events on lead 120 and the loop oscillator 136 output signal. Since the digital filter 150 consists of a weighted straight through path 152 and a parallel weighted accumulator path 153, operation is analogous to a second-order phase-locked loop, and the oscillator 136 will lock to both the frequency and phase of the input. The output of the oscillator 136, then, consists of regenerated superframe markers. By appropriately selecting the loop gain, transient timing errors caused by false alarms can be made quite small as, for example, one or two bits. Superframe markers missed by the correlator 100 and lock-on circuit 110 have no effect since, in their absence, the counter 142 which serves as a phase detector is not enabled for that frame. Finally, the loop coasts through those extended periods for which the window generation cycle is broken, thereby regenerating those lost superframe markers.

The stability of the loop bit-rate clock 54 must be sufficiently high that its drift produces an acceptably small superframe marker timing error for those durations when the phase locked loop 130 is not updating. It is to be understood that the components of phase locked loop 130 and lock-on circuit 110 can comprise any suitable component which is commercially available and functions as described hereinabove. For example, it is noted that filter operation is slow, that is, error updating occurs at the superframe rate, not the bit rate, and thus, readily available TTL technology can be used for this purpose.

In the arrangement of FIG. 5, it is desirous to inhibit the regenerated superframe marker signals generated by oscillator 136 from appearing on lead 51 prior to lock-on circuit 110 initially producing an output signal when the arrangement is first turned-on, or after initiation when it is determined that the window generator is no longer locked onto the received superframe marker signals. To prevent such transmission the phase locked loop 130 in FIG. 5 includes a delay network 170 coupled to input lead 120; an AND gate 172 having separate inputs thereof connected to the outputs of delay network 170 and, via a window generator 173, programmable counter 134; and a resettable counter 174 having the inputs thereof for incrementing purposes and resetting purposes connected to the outputs of programmable counter 134 and AND gate 172, respectively. A comparator 176 compares the value in the counter 174 with a preset value stored in preset circuit 178 and when the two values correspond, an output signal is generated to set a flip-flop 180 and produce an output signal therefrom which is inverted by inverter 182 and applied to one input of an AND gate 184. Flip-flop 180 is resettable by a signal from AND gate 172 to remove the inverted signal to AND gate 184. A second input to AND gate 184 is obtained from the output of programmable counter 134.

In operation, flip-flop 180 is initially set and sends an inhibit signal to AND gate 184 to prevent the output signals from programmable counter 134 from being gated onto lead 51. Each output pulse from programmable counter 134 causes window generator 173 to produce a short interval window enable signal to AND gate 172. When a pulse on lead 120 occurs, it is delayed in circuit 170 sufficiently to cause it to normally occur concurrent with the enable pulse from window generator 173. With these concurrent signals, flip-flop 182 is reset to remove the inhibit signal to AND gate 184 and the pulses from oscillator 136 are gated onto lead 51. When a pulse is not present on lead 120 concurrent with the enable signal from window generator 173, counter 174 is not reset and counts each output pulse from oscillator 136 until either the count reaches the present value stored in circuit 178 at which time comparator sends an output signal to set flip-flop 180 and causes AND gate 184 to be inhibited, or a reset pulse is produced by AND gate 172 prior to the preset count being reached.

Figure 6:
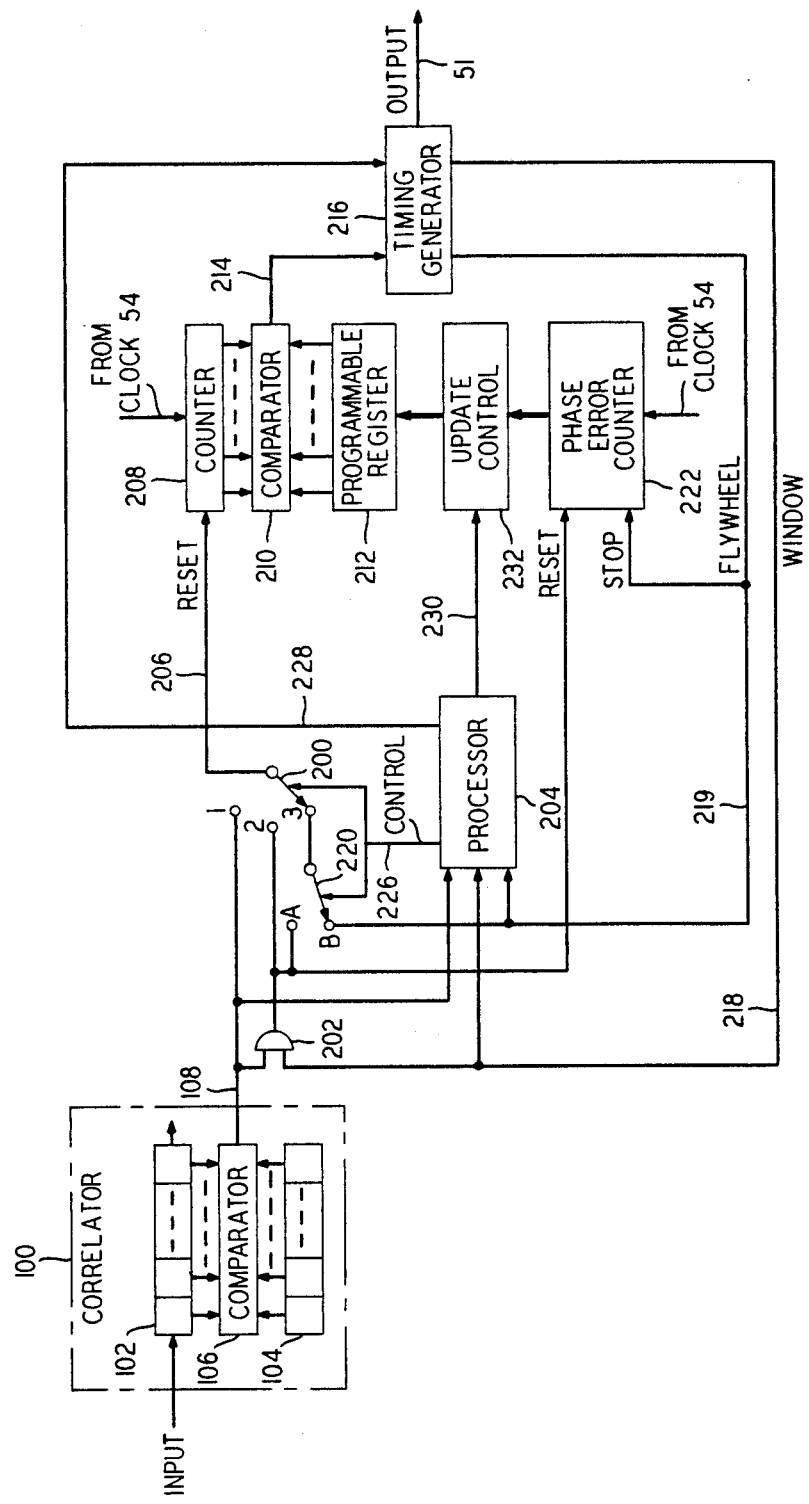
FIG. 6 is a block schematic of another arrangement for implementing the frame synchronization and regeneration circuit of the processor for a TDMA burst modem in accordance with the present invention.

FIG. 6 shows an alternative preferred arrangement for regenerating superframe markers. The input signal from demodulator 41 and multiplexer 47 is received in correlator 100 which corresponds in structure and operation to that described for correlator 100 in FIG. 5. The output pulses from correlator 100 on lead 108 are concurrently applied to terminal 1 of a switch 200, an AND gate 202 and a processor 204. The output from switch 200 on lead 206 is used to reset a counter 208 which counts clock pulses at the bit transmission rate of the system once enabled. The instantaneous digital count in counter 208 is compared in comparator 210 with a digital count value from a programmable register 212 to produce an enable pulse on lead 214 when the two counts correspond. The output on lead 214 is applied to a timing generator 216 which is capable of, once enabled, supplying (a) a window signal to both processor 204 and a separate input terminal of AND gate 202 on a lead 218; (b) a flywheel pulse on lead 219 to each of processor 204, a B terminal of a switch 220, and the stop terminal of a phase error counter 222, and (c) a regenerated superframe marker on lead 51 to counters 52 and 53 of FIG. 4.

The output from AND gate 202 is connected to the No. 2 and A terminals of switches 200 and 220, respectively, and to the reset terminal of phase error counter 222. The output from switch 220 is connected to the No. 3 terminal of switch 200. Processor 204 positions switch 200 and 220 via signals on control leads 226 and provides output signals on lead 228 to timing generator 216 and on lead 230 to an update control circuit 232 which also receives as an input a count value from phase error counter 222. The output from update control circuit 232 is a count value which is applied as an input to update the value in programmable register 212.

In operation, on initiation, switch 200 is positioned to connect input terminal No. 1 to the output and switch 220 to connect input terminal A to the output. A first pulse from correlator 100 on lead 108 resets counter 208 and causes processor 204 to set switch 200 to connect input terminal 2 to the output terminal. Counter 208 counts a number of clock pulses slightly less than the nominal superframe length. The decoding of this value is set by the contents of the programmable register 212, which can be changed as necessary, to track long-term clock drifts. After counting for approximately one superframe, the timing generator 216 is triggered to generate a signal on lead 218 which effectively opens a short duration window interval centered around the expected time of the next superframe marker pulse from correlator 100. If no pulse appears concurrent with a generated window signal, most likely because the first pulse from correlator 100 was a false alarm, the processor 204 repositions switch 200 to position one, and the next pulse from correlator 100 reinitiates the sequence. If, however, a second pulse from correlator 100 does appear within the window interval, it passes through the AND gate 202 and switch 200 and initiates a second frame count in counter 208 and an associated window from timing generator 216. If this process is repeated for a total of x times, it has therefore, been required that a total of x+1 UW pulses, spaced approximately by the expected superframe length, must occur before it is assumed the arrangement of FIG. 6 is locked onto the superframe sequence.

Having acquired sufficient appropriately spaced pulses from correlator 100, the processor 204 moves the switch 200 to position three, so that subsequent windowed pulses from correlator 100 continue to reset the counter 208 and thereby cause the window timing of timing generator 216 to track slow changes in the arrival of the superframe markers. Since the probability of detecting the superframe marker is not unity because of transmission errors, a "flywheel" pulse is also generated by the timing generator 216 on lead 219, and is used to keep the window in approximately the correct position when a pulse from correlator 100 is not present during a window interval. This is accomplished by timing generator 216 generating the "flywheel" pulse at the end of the window interval during which time processor 204 concurrently repositions switch 220 to connect the B input to input terminal 3 of switch 200 to permit the "flywheel" pulse to reset counter 208 and sends a signal on lead 228 to timing generator 216 to generate short windows which are displaced in time somewhat from the original short window intervals. If a concurrent displaced window signal and pulse from correlator 100 are detected before a certain number of missed pulses have occurred, then processor 204 restores switch 220 to the A terminal and instructs timing generator 216 to again generate the short window intervals which are not displaced. Timing generator 216 also produces a regenerated superframe marker pulse on lead 51 which corresponds in time with the arrival or expected arrival of the actual superframe marker.

If an excessive number of sequential pulses from correlator 100 in a row are missed, the processor 204 makes at least one try at recapturing the true superframe marker sequence before initiating a completely new search. This amounts to widening the window on lead 218, recognizing that over a number of superframes the epoch of the received superframe marker may drift with respect to the local clock. If this procedure should fail, the output of timing generator 216 on lead 51 is inhibited and a new search is begun.

Figure 7:
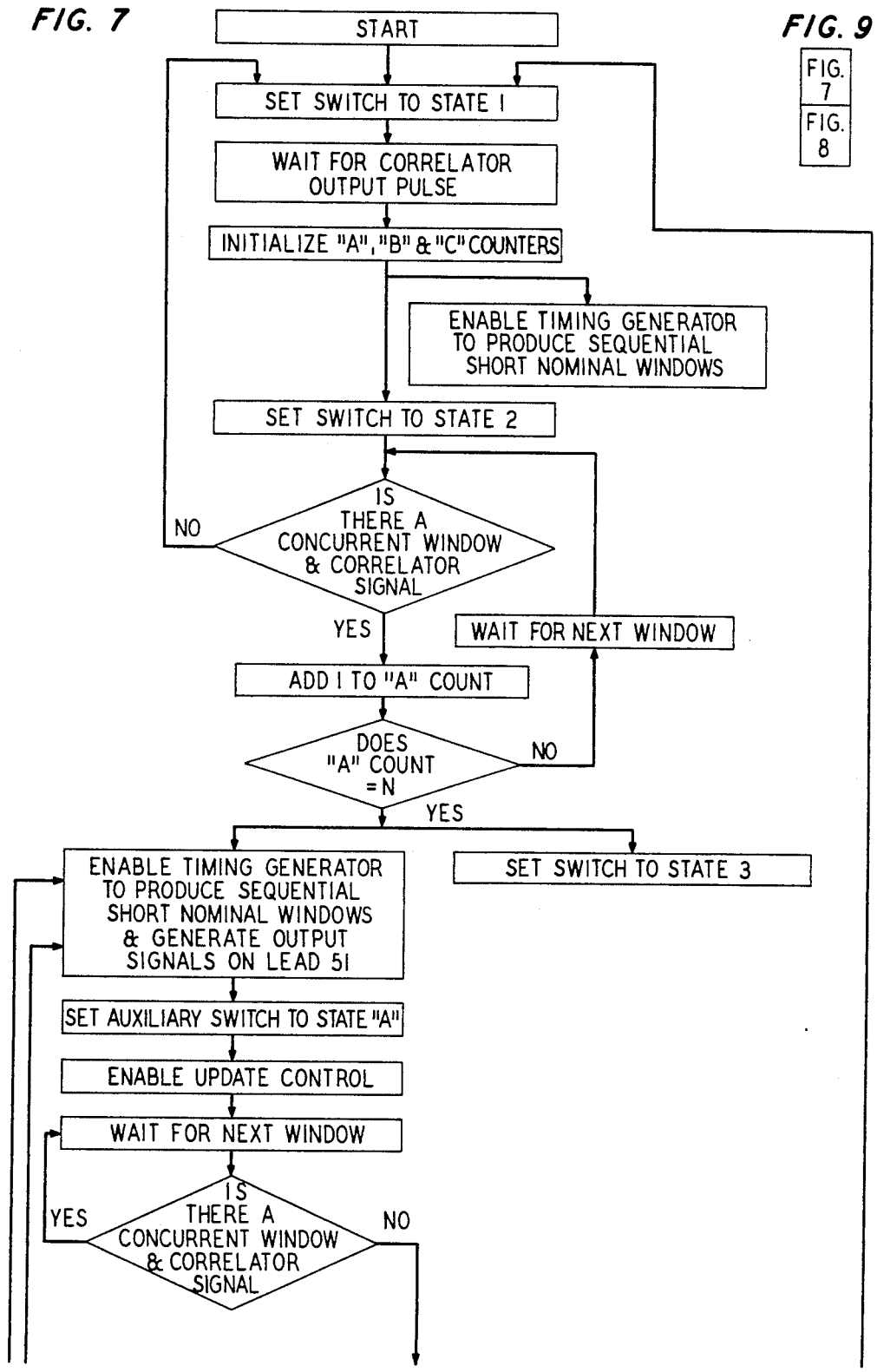
Figure 8:
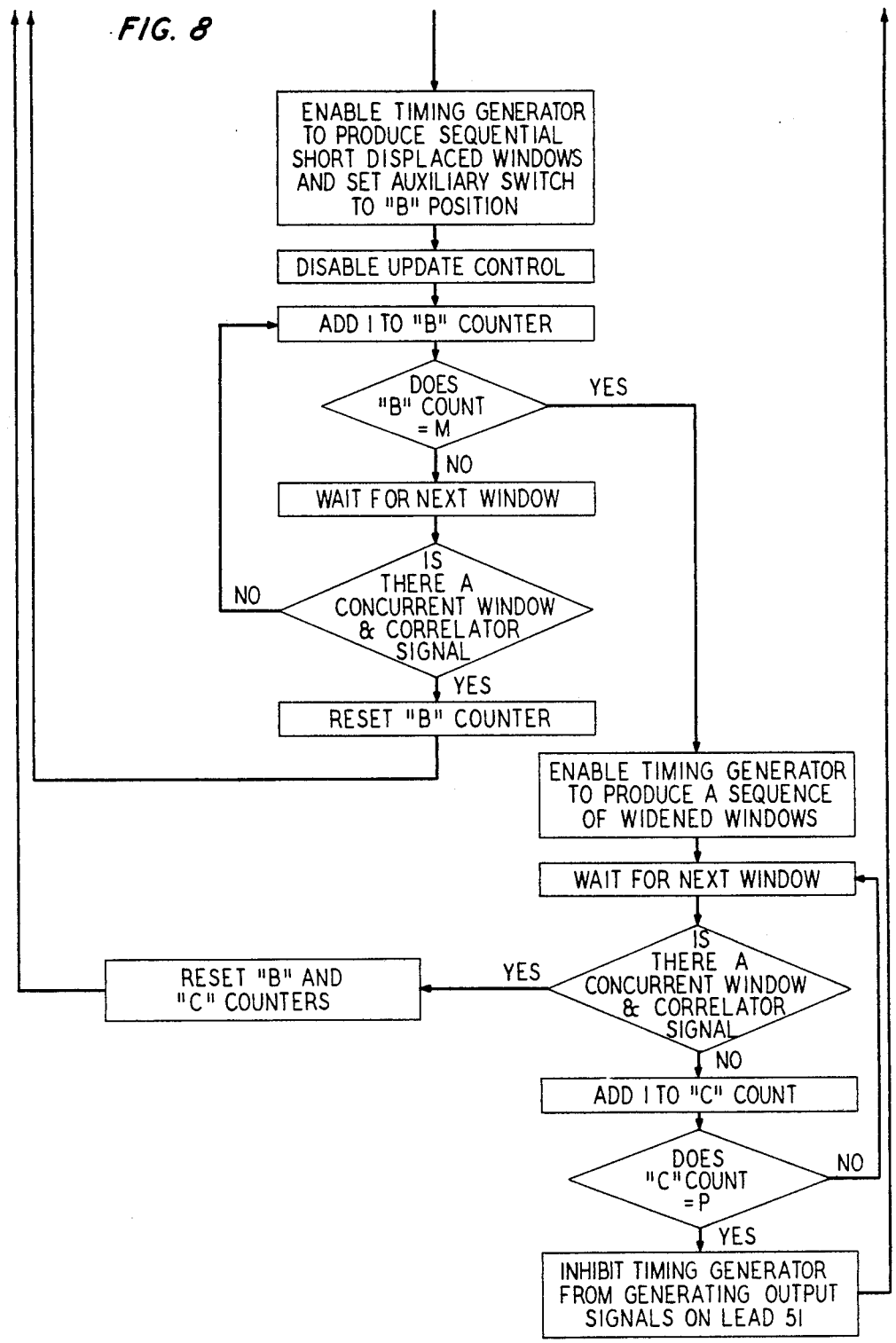

When it becomes necessary to begin a new search, transmissions from the subject earth station must temporarily cease, lest its transmitted bursts overlap those of some other station. Thus, there is a tradeoff between clock stability and the number of consecutive misses allowed before attempts are made to reacquire the UW sequence. A typical flow diagram of the operation of processor 204 to accomplish the described sequence is shown in FIGS. 7 and 8.

Phase error counter 222 is reset or started on the occurrence of a concurrent pulse from correlator 100 and a window signal on lead 218 from timing generator 216 and counts clock pulses until stopped by a "flywheel" pulse on lead 219. This count is used by update control 232, when enabled by a signal on lead 230 from processor 204, to update the value of programmable register 212. Phase error counter 222 and update control 232 perform a function similar to that of phase detector 140 and filter 150 in FIG. 5 for updating programmable counter 134.

It is to be understood that the above-described embodiments are simply illustrative of the principles of the invention. Various other modifications and changes may be made by those skilled in the art which will embody the principles of the invention and fall within the spirit and scope thereof.

We claim:

1. A processing arrangement for interfacing a TDMA burst modem and slow speed terminal processing equipment in a communication system which interchanges bursts of information in assigned time slots of a repetitive TDMA communication sequence, each TDMA communication sequence including a sequence marker signal disposed at a predetermined location therein for reception by the burst modem, the processing arrangement comprising:

first means (50) capable of both detecting the sequence marker signals in the repetitive TDMA communication sequence and generating an output signal in response to the detection thereof;

second means (52, 62) capable of generating a window signal for each burst of information within the TDMA communication sequence desired to be processed by the slow speed terminal processing equipment in response to an output signal from the first means

CHARACTERIZED IN THAT the first means comprises circuitry which also generates an output signal corresponding in time to the normally received sequence marker signals;

the second means generates a window signal which starts at a first predetermined interval and ends at a second predetermined interval from each output signal from the first means, said first and second predetermined interval being scheduled to occur slightly before and slightly after, respectively, the anticipated reception of the desired burst of information; and the processing arrangement further comprises a memory (48, 56) capable of directly storing the portion of the TDMA communication sequence being received during the interval of the window signal generated by the second means in a first section thereof (48) for subsequent detection of the burst information and slow speed processing thereof by the terminal equipment.

2. The processing arrangement according to claim 1

CHARACTERIZED IN THAT the processing arrangement further comprises:

third means (53, 57) capable of generating a window signal which starts at a third predetermined interval and ends at a fourth predetermined interval from each output signal from the first means, said third and fourth interval having an interval therebetween which corresponds to the length of a burst of information in an assigned time slot of the TDMA communication sequence; and the memory (48, 56) is further capable of temporarily storing a burst of information received from the slow speed terminal processing equipment and transmitting said burst of information directly to the TDMA burst modem during the interval of the window signal generated by said third means.

3. The processing arrangement according to claims 1 or 2 wherein the first means (50) comprises:

a correlator (100) capable of both detecting when a predetermined plurality of consecutive symbols in both a received TDMA communication sequence and a stored unique word, representative of a sequence marker signal, correspond, and generating an output signal in response to the detection thereof; and lock-on means (110, FIG. 5; 200, 202, 204, 208, 210, 212, 214, 216, FIG. 6) capable of both detecting from the correlator output signals a plurality of y periodic sequence marker signals which are received in y consecutive TDMA communication sequences and generating an output signal in response to the detection thereof;

CHARACTERIZED IN THAT the first means further comprises a sequence marker signal regeneration means (130, FIG. 5; 204, 212, 216, 220, 222, 232, FIG. 6) comprising an oscillator (136, FIG. 5; 216, FIG. 6) capable of separately generating a continuous sequence of first means output signals which have a period corresponding to the period of the expected reception of the periodic sequence marker signals; and updating means (140, 150, FIG. 5; 222, 232, 212, FIG. 6) capable of detecting phase differences between the output signals from the lock-on means and said oscillator and generating an output signal capable of altering the phase of said oscillator to eliminate said phase differences.

4. The processing arrangement according to claim 3 wherein the first means further comprises inhibiting means (170, 172, 174, 176, 178, 180, 182, 184, FIG. 5; 204, 216, FIG. 6) comprising first means capable of detecting the failure of the correlator to generate a plurality of z output signals concurrent with the expected reception by the processing arrangement of z consecutive periodic sequence marker signals and generating an output signal in response to the failure detection thereof for inhibiting the output signal of said first means

CHARACTERIZED IN THAT the inhibiting means further comprises second means (180, 182, FIG. 5; 204, 216, FIG. 6) capable of, during an initiation sequence of the processing arrangement, causing the output signals from said first means to be inhibited until the lock-on means generates a first one of its output signals.

5. The processing arrangement according to claim 3

CHARACTERIZED IN THAT the lock-on means comprises first window generation means (112, 116, 117, FIG. 5) comprising an input coupled to the output of the correlator, and circuitry capable of generating, in response to an input signal, an output enable signal occurring for a short interval of time at approximately one TDMA communication sequence interval after said input signal;

first gating means (113, FIG. 5) capable of gating an output signal from the correlator therethrough when said output signal from the correlator is received concurrent with said output enable signal from the first window generation means;

second window generation means (118, 119, FIG. 5) comprising an input terminal coupled to the output of said first gating means, and circuitry capable of generating, in response to an input signal, an output enable signal occurring for a short interval of time at approximately one TDMA communication sequence after said input signal; and second gating means (114, FIG. 5) capable of gating an output signal from the correlator therethrough when the output signal from said correlator is received concurrent with the output enable signal from the second window generation means.

6. The processing arrangement according to claim 5

CHARACTERIZED IN THAT the output of the second window generation means is also coupled to the input of said first window generation means.

7. An arrangement (50) for detecting and regenerating sequence marker signals received in a predetermined location within a repetitive TDMA communication sequence, the arrangement comprising:

a correlator (100) capable of both detecting when a predetermined plurality of consecutive symbols in both a received TDMA communication sequence and a stored unique word, representative of a sequence marker signal, correspond, and generating an output signal in response to the detection thereof;

lock-on means (110, FIG. 5; 200, 202, 204, 208, 210, 212, 214, 216, FIG. 6) capable of both detecting from the correlator output signals a plurality of y periodic sequence marker signals which are received in y consecutive TDMA communications sequences and generating an output signal in response to the detection thereof; and inhibiting means (170, 172, 174, 176, 178, 180, 182, 184, FIG. 5; 204, 216, FIG. 6) comprising first means capable of detecting the failure of the correlator to generate a plurality of z output signals concurrent with the expected reception by the processing arrangement of z consecutive periodic sequence marker signals and generating an output signal in response to the failure detection thereof for inhibiting the output signal of the arrangement

CHARACTERIZED IN THAT the arrangement further comprises a sequence marker signal regeneration means (130, FIG. 5; 204, 212, 216, 220, 222, 232, FIG. 6) comprising an oscillator (136, FIG. 5; 216, FIG. 6) capable of separately generating a continuous sequence of arrangement output signals which have a period corresponding to the period of the expected reception of the periodic sequence marker signals; and updating means (140, 150, FIG. 5; 222, 232, 212, FIG. 6) capable of detecting phase differences between the output signals from the lock-on means and said oscillator and generating an output signal capable of altering the phase of said oscillator to eliminate said phase differences; and the inhibiting means further comprises second means (180, 182, FIG. 5; 204, 216, FIG. 6) capable of, during an initiation sequence of the arrangement, causing the output signals from the arrangement to be inhibited until the lock-on means generates a first one of its output signals.

8. The arrangement according to claim 7

CHARACTERIZED IN THAT the lock-on means comprises first window generation means (112, 116, 117, FIG. 5) comprising an input coupled to the output of the correlator, and circuitry capable of generating, in response to an input signal, an output enable signal occurring for a short interval of time at approximately one TDMA communication sequence after said input signal;

first gating means (113, FIG. 5) capable of gating an output signal from the correlator therethrough when said output signal from the correlator is received concurrent with said output enable signal from the first window generation means;

second window generation means (118, 119, FIG. 5) comprising an input terminal coupled to the output of said first gating means, and circuitry capable of generating, in response to an input signal, an output enable signal occurring for a short interval of time at approximately one TDMA communication sequence after said input signal; and second gating means (114, FIG. 5) capable of gating an output signal from the correlator therethrough when the output signal from said correlator is received concurrent with the output enable signal from the second window generation means.

9. The arrangement according to claim 8 CHARACTERIZED IN THAT
the output of the second window generation means is also coupled to the input to said first window generation means.

10. The arrangement according to claim 7 CHARACTERIZED IN THAT
the lock-on means comprises
a gating means comprising
  a first switchable means (200, FIG. 6) comprising a first, second and third input terminal which are selectively switchable to an output terminal, the first input terminal being coupled to the output of the correlator,
  an AND gate (202, FIG. 6) comprising a first input terminal coupled to the output of the correlator, a second input terminal, and an output terminal coupled to second input terminal of said first switchable means, and
  a second switchable means (220, FIG. 6) comprising a first input terminal coupled to the output of said AND gate, a second input terminal, and an output terminal coupled to the third input terminal of said first switchable means;
window generating means (208, 210, 212, 216, FIG. 6) comprising an input terminal coupled to the output terminal of said first switchable means, a first and a second output terminal coupled to the second input terminal of said AND gate and said second switchable means, respectively, and circuitry capable of generating both an output enable signal at said first output terminal, which occurs for a short interval of time at approximately one TDMA communication sequence interval after said input signal, and a pulse at said second output terminal at the termination of the ouput enable signal at said first output terminal; and a processor (204, FIG. 6) comprising a first input terminal coupled to the output of the correlator, a second and a third input terminal coupled to the first and second output terminal, respectively, of said window generating means, an output coupled to the first and second switchable means, and control means capable of (a) generating a first control signal at said output to cause the first and second switchable means to interconnect their associated first input terminal and output terminal, (b) generating a second control signal at said output in response to a first one of an input signal at the first input terminal of said processor to cause said first switchable means to interconnect the second input terminal and the output terminal thereof, (c) generating a third control signal at said output in response to the detection of a plurality of y consecutive and concurrent signals at the first and second input terminals of said processor to cause said first switchable means to interconnect the third input terminal and the output terminal thereof, and (d) generating a fourth control signal at said output immediately upon a failure of concurrent signals at the first and second input terminals of the processor to cause said second switchable means to interconnect the second input terminal and the output terminal thereof.

11. The arrangement according to claim 10 CHARACTERIZED IN THAT
said processor control means further includes circuitry capable of detecting, after generation of the fourth control signal, the occurrence of a plurality of z consecutive failures of concurrent signals at the first and second input terminals of the processor, and generating said first control signal at said output in response to the detection of said z consecutive failures.

* * * * *